United States Patent
Mikuni et al.

(10) Patent No.: US 12,476,275 B2
(45) Date of Patent: Nov. 18, 2025

(54) ELECTROLYTE SHEET AND MANUFACTURING METHOD OF SECONDARY BATTERY

(71) Applicant: LG ENERGY SOLUTION, LTD., Seoul (KR)

(72) Inventors: Hiroki Mikuni, Tokyo (JP); Takuya Nishimura, Tokyo (JP); Masayo Horikawa, Tokyo (JP)

(73) Assignee: LG ENERGY SOLUTION, LTD., Seoul (KR)

( * ) Notice: Subject to any disclaimer, the term of this patent is extended or adjusted under 35 U.S.C. 154(b) by 560 days.

(21) Appl. No.: 17/917,104

(22) PCT Filed: Apr. 7, 2020

(86) PCT No.: PCT/JP2020/015734
§ 371 (c)(1),
(2) Date: Nov. 4, 2022

(87) PCT Pub. No.: WO2021/205550
PCT Pub. Date: Oct. 14, 2021

(65) Prior Publication Data
US 2023/0155166 A1    May 18, 2023

(51) Int. Cl.
*H01M 10/056* (2010.01)
*H01M 4/04* (2006.01)
*H01M 10/052* (2010.01)

(52) U.S. Cl.
CPC ....... *H01M 10/056* (2013.01); *H01M 4/0404* (2013.01); *H01M 10/052* (2013.01); *H01M 2300/0091* (2013.01)

(58) Field of Classification Search
CPC ........... H01M 4/0404; H01M 10/0565; H01M 10/52; H01M 4/04
See application file for complete search history.

(56) References Cited

U.S. PATENT DOCUMENTS

| | | |
|---|---|---|
| 2019/0393548 A1 | 12/2019 | Vereecken et al. |
| 2020/0259214 A1 | 8/2020 | Nishimura et al. |
| 2021/0075054 A1 | 3/2021 | Nishimura et al. |
| 2021/0091409 A1 | 3/2021 | Mimura et al. |

FOREIGN PATENT DOCUMENTS

| | | |
|---|---|---|
| CN | 110679027 A | 1/2020 |
| CN | 110710044 A | 1/2020 |
| JP | 2012156054 A | 8/2012 |
| JP | 2016-062709 A | 4/2016 |
| JP | 2018206561 A | 12/2018 |
| KR | 10-2020-0014332 A | 2/2020 |

(Continued)

OTHER PUBLICATIONS

Masteral Dissertation, Study on the Preparation and Performances of Composite Porous Polymer Electrolyte for Lithium-ion Batteries, Feb. 16, 2017 (English abstract provided).

*Primary Examiner* — Sarah A. Slifka
(74) *Attorney, Agent, or Firm* — Bryan Cave Leighton Paisner LLP (57) ABSTRACT

An aspect of the present invention provides a manufacturing method for an electrolyte sheet, the manufacturing method including a step of molding a composition containing a polymer, Li[TFSI], oxide particles, and a dispersion medium into a sheet shape and volatilizing the dispersion medium at 100° C. or higher.

4 Claims, 5 Drawing Sheets

(56) References Cited

FOREIGN PATENT DOCUMENTS

| | | |
|---|---|---|
| WO | 2017099248 A1 | 6/2017 |
| WO | 2018220800 A1 | 12/2018 |
| WO | 2018221669 A1 | 12/2018 |
| WO | 2019188693 A1 | 10/2019 |
| WO | 2019208110 A1 | 10/2019 |
| WO | 2020/017439 A1 | 1/2020 |

ELECTROLYTE SHEET AND MANUFACTURING METHOD OF SECONDARY BATTERY

TECHNICAL FIELD

The present invention relates to an electrolyte sheet and a manufacturing method for a secondary battery.

BACKGROUND ART

In recent years, high-performance secondary batteries are needed due to widespread use of portable electronic equipment, electric vehicles, and the like. In conventional secondary batteries, since liquid electrolytes including flammable organic solvents are used, there is a concern in terms of safety. Thus, solid-state batteries that use solid electrolytes have been developed as secondary batteries with higher safety. Regarding the solid electrolytes, organic polymer solid electrolytes, inorganic solid electrolytes, and the like are known, and these solid electrolytes are often formed into a sheet shape and used in solid-state batteries.

For example, Patent Literature 1 discloses a manufacturing method for a solid electrolyte sheet, the manufacturing method including a step of applying a solid electrolyte slurry on a base material; and a step of drying the solid electrolyte slurry applied on the base material and forming a solid electrolyte layer on the base material.

CITATION LIST

Patent Literature

Patent Literature 1: Japanese Unexamined Patent Publication No. 2016-062709

SUMMARY OF INVENTION

Technical Problem

With regard to a secondary battery that uses a solid electrolyte as an electrolyte layer, it is preferable that the physical strength (tensile strength and the like) of the electrolyte layer is excellent, from the viewpoint of obtaining a secondary battery having excellent battery characteristics. However, it has been found by an investigation conducted by the inventors of the present invention that depending on the composition of the electrolyte layer, the production conditions, and the like, the strength of the electrolyte layer may be insufficient.

An object of an aspect of the present invention is to provide a manufacturing method for an electrolyte sheet having excellent tensile strength, which is suitably used as an electrolyte layer for a secondary battery.

Solution to Problem

The present inventors found that an electrolyte sheet having excellent tensile strength is obtained by using a specific compound as an electrolyte salt to be included in an electrolyte sheet and then shaping the electrolyte salt into a sheet shape under specific conditions, and this is suitably used as an electrolyte layer for a secondary battery, thus completing the present invention.

According to an aspect of the present invention, there is a manufacturing method for an electrolyte sheet, the manufacturing method including a step of shaping a composition containing a polymer, Li[TFSI], oxide particles, and a dispersion medium into a sheet shape and volatilizing the dispersion medium at 100° C. or higher.

In this manufacturing method, since Li[TFSI] is used as an electrolyte salt, and the dispersion medium is volatilized at 100° C. or higher from the composition (slurry) containing the components of the electrolyte sheet, the electrolyte sheet has excellent tensile strength. Furthermore, since Li[TFSI] is used as the electrolyte salt, even when the dispersion medium is volatilized at a high temperature such as 100° C. or higher, discoloration of the electrolyte sheet caused by the effect of heating is suppressed so that the external appearance is excellent. Moreover, since this electrolyte sheet has excellent ionic conductance, the electrolyte sheet can be suitably used as an electrolyte layer of a secondary battery.

The composition may further contain at least one solvent selected from the group consisting of an ionic liquid and a glyme represented by the following Formula (1):

$$R^1O-(CH_2CH_2O)_k-R^2 \qquad (1)$$

wherein in Formula (1), $R^1$ and $R^2$ each independently represent an alkyl group having 1 to 4 carbon atoms; and k represents an integer of 3 to 6.

According to another aspect of the present invention, there is provided a manufacturing method for a secondary battery, the manufacturing method including a step of forming a positive electrode mixture layer on a positive electrode current collector to obtain a positive electrode; a step of forming a negative electrode mixture layer on a negative electrode current collector to obtain a negative electrode; and a step of disposing an electrolyte sheet obtainable by the above-described manufacturing method between the positive electrode and the negative electrode.

Advantageous Effects of Invention

According to an aspect of the present invention, an electrolyte sheet having excellent tensile strength, which is suitably used as an electrolyte layer of a secondary battery, can be produced.

DESCRIPTION OF EMBODIMENTS

Hereinafter, embodiments of the present invention will be described with appropriate reference to the drawings. However, the present invention is not intended to be limited to the following embodiments. In the following embodiments, the constituent elements thereof (also including steps and the like) are not essential, unless particularly stated otherwise. The sizes of the constituent elements in each diagram are merely conceptual, and the relative relationships between the sizes of the constituent elements is not limited to the relationship shown in each diagram.

The numerical values and ranges thereof in the present specification do not limit the present invention. A numerical value range expressed by using the term "to" in the present specification represents a range including the numerical values described before and after the term "to" as the minimum value and the maximum value, respectively. With regard to a numerical value range described stepwise in the present specification, the upper limit value or lower limit value described in one numerical value range may be replaced with the upper limit value or lower limit value described in another stage. Furthermore, with regard to a numerical value range described in the present specification, the upper limit value or lower limit value of that numerical value range may be replaced with a value disclosed in the Examples.

In the present specification, the following abbreviations may be used.

Figure 1:
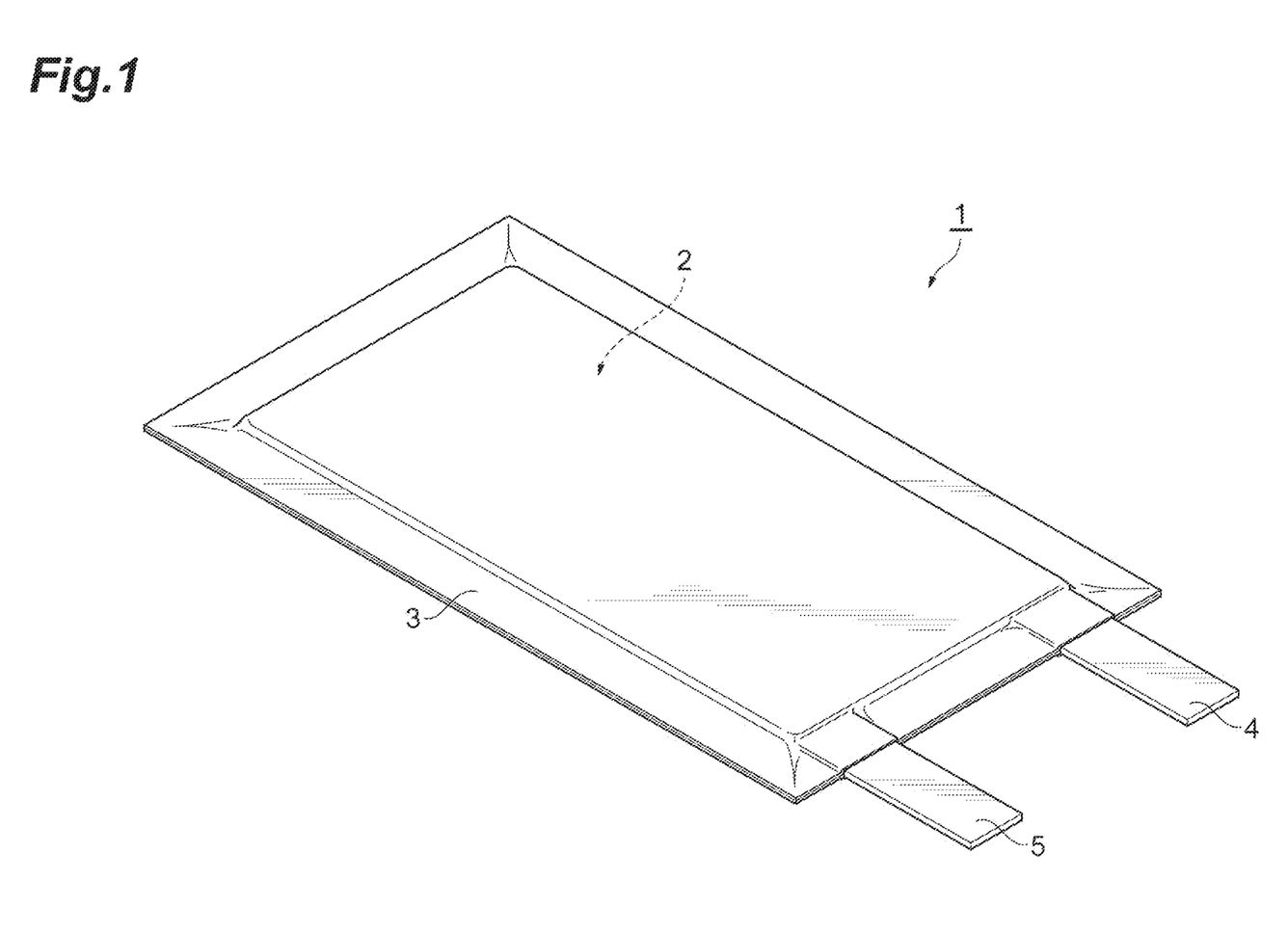
FIG. 1 is a perspective view illustrating a secondary battery of an embodiment of the invention.

[FSI]$^-$: N(SO$_2$F)$_2^-$, bis(fluorosulfonyl)imide anion
[TFSI]$^-$: N(SO$_2$CF$_3$)$_2^-$, bis(trifluoromethanesulfonyl)imide anion
[BOB]$^-$: B(O$_2$C$_2$O$_2$)$_2^-$, bisoxalatoborate anion
[f3C]$^-$: C(SO$_2$F)$_3^-$, tris(fluorosulfonyl)carbo anion FIG. 1 is a perspective view illustrating a secondary battery of an embodiment. As shown in FIG. 1, a secondary battery 1 includes an electrode group 2 composed of a positive electrode, a negative electrode, and a sheet-shaped electrolyte layer (electrolyte sheet); and a bag-shaped battery outer packaging 3 housing the electrode group 2. The positive electrode and the negative electrode are provided with a positive electrode current collecting tab 4 and a negative electrode current collecting tab 5, respectively. The positive electrode current collecting tab 4 and the negative electrode current collecting tab 5 protrude outward from the inside of the battery outer packaging 3 such that the positive electrode and the negative electrode can be each electrically connected to the external part of the secondary battery 1.

The battery outer packaging 3 may be formed from, for example, a laminate film. The laminate film may be, for example, a laminated film in which a resin film such as a polyethylene terephthalate (PET) film; a metal foil of aluminum, copper, stainless steel, or the like; and a sealant layer of polypropylene or the like are laminated in this order.

Figure 2:
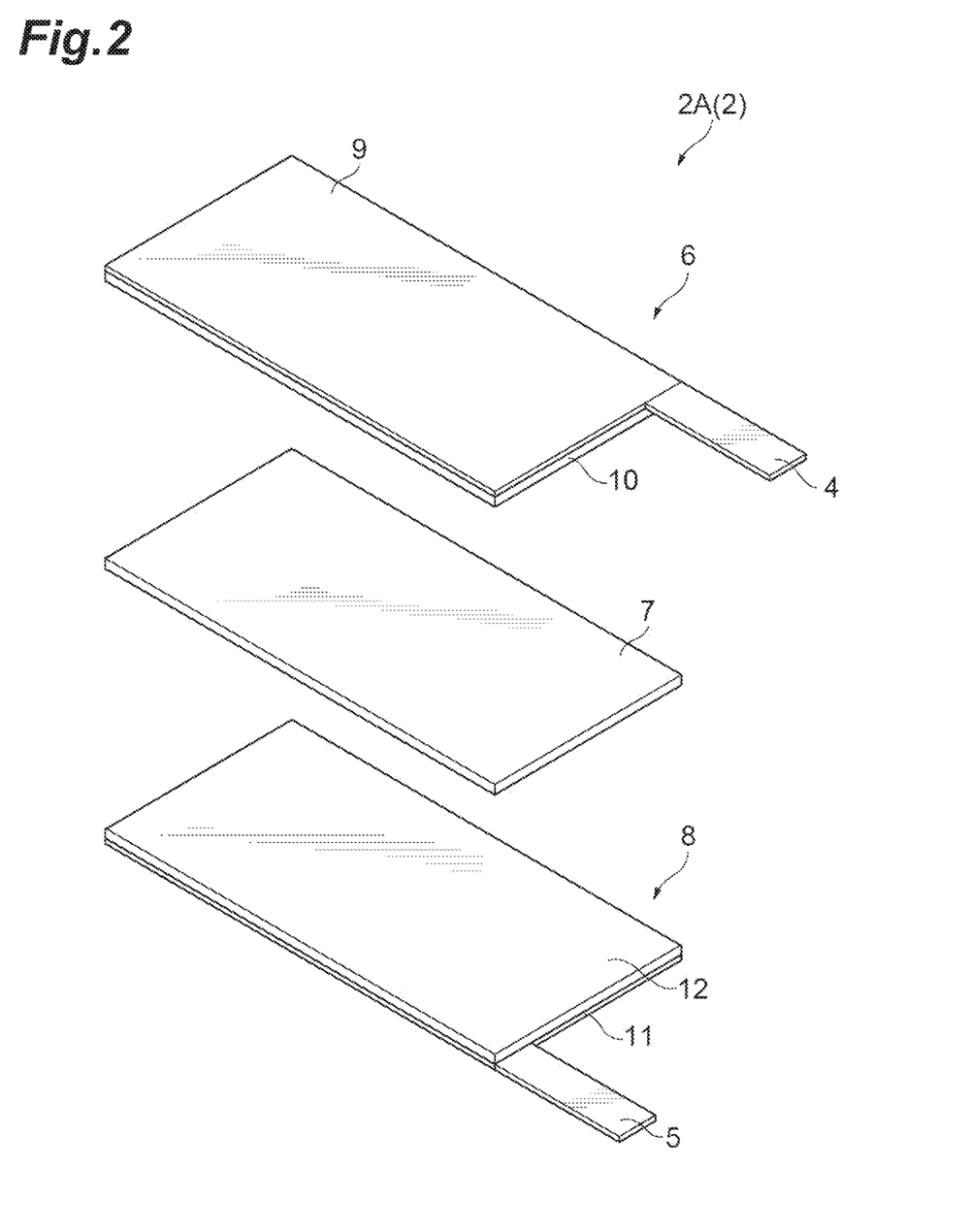
FIG. 2 is an exploded perspective view illustrating an embodiment of an electrode group of the secondary battery shown in FIG. 1.

FIG. 2 is an exploded perspective view illustrating an embodiment of an electrode group 2 of the secondary battery 1 shown in FIG. 1. As shown in FIG. 2, an electrode group 2A includes a positive electrode 6, an electrolyte sheet 7, and a negative electrode 8 in this order. The positive electrode 6 includes a positive electrode current collector 9 and a positive electrode mixture layer 10 provided on the positive electrode current collector 9. The positive electrode current collector 9 of the positive electrode 6 is provided with a positive electrode current collecting tab 4. The negative electrode 8 includes a negative electrode current collector 11 and a negative electrode mixture layer 12 provided on the negative electrode current collector 1. The negative electrode current collector 11 of the negative electrode 8 is provided with a negative electrode current collecting tab 5.

The positive electrode current collector 9 may be formed from a metal such as aluminum, titanium, or tantalum; an alloy thereof; or the like. The positive electrode current collector 9 is preferably formed from aluminum or an alloy thereof, in order to be lightweight and have a high weight energy density. The thickness of the positive electrode current collector 9 may be 10 μm or more and may be 100 μm or less.

According to an embodiment, the positive electrode mixture layer 10 contains a positive electrode active material and a binder.

The positive electrode material may be a lithium transition metal compound such as a lithium transition metal oxide or a lithium transition metal phosphate.

The lithium transition metal oxide may be, for example, lithium manganate, lithium nickelate, or lithium cobaltate. The lithium transition metal oxide may also be a lithium transition metal oxide in which a portion of the transition metal such as Mn, Ni, or Co contained in lithium manganate, lithium nickelate, lithium cobaltate, or the like has been substituted with one kind or two or more kinds of other transition metals or a metal element such as Mg or Al (typical element). That is, the lithium transition metal oxide may be a compound represented by LiM$^1$O$_2$ or LiM$^1_2$O$_4$ (wherein M$^1$ includes at least one transition metal). The lithium transition metal oxide may be specifically Li(Co$_{1/3}$Ni$_{1/3}$Mn$_{1/3}$)O$_2$, LiNi$_{1/2}$Mn$_{1/2}$O$_2$, LiNi$_{1/2}$Mn$_{3/2}$O$_4$, or the like.

From the viewpoint of further enhancing the energy density, the lithium transition metal oxide is preferably a compound represented by the following Formula (A):

$$Li_aNi_bCo_cM^2_dO_{2+e} \quad (A)$$

wherein M$^2$ is at least one selected from the group consisting of Al, Mn, Mg, and Ca; and a, b, c, d, and e are respectively numbers that satisfy 0.2≤a≤1.2, 0.5≤b≤0.9, 0.1≤c≤0.4, 0≤d≤0.2, −0.2≤e≤0.2, and b+c+d=1.

The lithium transition metal phosphate may be LiFePO$_4$, LiMnPO$_4$, LiMn$_x$M$^3_{1-x}$PO$_4$ (wherein 0.3≤x≤1; and M$^3$ represents at least one element selected from the group consisting of Fe, Ni, Co, Ti, Cu, Zn, Mg, and Zr), or the like.

The positive electrode active material may be primary particles that are not granulated or may be granulated secondary particles.

The particle size of the positive electrode active material is adjusted so as to be equal to or less than the thickness of the positive electrode mixture layer 10. When there are crude particles having a particle size of equal to or more than the thickness of the positive electrode mixture layer 10 in the positive electrode active material, crude particles are removed in advance by sieve classification, air stream classification, or the like, and a positive electrode active material having a particle size of equal to or less than the thickness of the positive electrode mixture layer 10 is selected.

The average particle size of the positive electrode active material is preferably 0.1 μm or more, and more preferably 1 μm or more. The average particle size of the positive electrode active material is preferably 30 μm or less, and more preferably 25 μm or less. The average particle size of the positive electrode active material is the particle size (D$_{50}$) when the ratio with respect to the volume (volume ratio) of the entire positive electrode active material is 50%. The average particle size (D$_{50}$) of the positive electrode active material is obtained by measuring a suspension in which the positive electrode active material is suspended in water, by a laser scattering method by using a laser scattering type particle size analyzer (for example, a MicroTrac).

The content of the positive electrode active material may be 60% by mass or more, 70% by mass or more, 80% by mass or more, or 90% by mass or more, and may be 99% by mass or less, based on the total amount of the positive electrode mixture layer.

The binder may be a polymer containing at least one selected from the group consisting of ethylene tetrafluoride, vinylidene fluoride, hexafluoropropylene, acrylic acid, maleic acid, ethyl methacrylate, methyl methacrylate, and acrylonitrile as a monomer unit; a rubber such as a styrene-butadiene rubber, an isoprene rubber, or an acrylic rubber; or the like. The binder is preferably polyvinylidene fluoride or a copolymer containing hexafluoropropylene and vinylidene fluoride as structural units.

The content of the binder may be 0.3% by mass or more, 0.5% by mass or more, 1% by mass or more, or 1.5% by mass or more, and may be 10% by mass or less, 8% by mass or less, 6% by mass or less, or 4% by mass or less, based on the total amount of the positive electrode mixture layer.

The positive electrode mixture layer 10 may further contain a conductive material. The conductive material may be a carbon material such as carbon black, acetylene black, graphite, carbon fibers, or carbon nanotubes; or the like. These conductive materials may be used singly or in combination of two or more kinds thereof.

The content of the conductive material may be 0.1% by mass or more, 1% by mass or more, or 3% by mass or more, based on the total amount of the positive electrode mixture layer. From the viewpoint of suppressing an increase in the volume of the positive electrode 6 and a consequent decrease in the energy density of the secondary battery 1, the content of the conductive material is preferably 15% by mass or less, more preferably 10% by mass or less, and even more preferably 8% by mass or less, based on the total amount of the positive electrode mixture layer.

The positive electrode mixture layer 10 may further contain a solvent that will be described below. In that case, the content of the solvent is preferably 3% by mass or more, more preferably 5% by mass or more, and even more preferably 10% by mass or more, and is preferably 30% by mass or less, more preferably 25% by mass or less, or even more preferably 20% by mass or less, based on the total amount of the positive electrode mixture layer.

From the viewpoint of enhancing the conductivity of the secondary battery 1, the thickness of the positive electrode mixture layer 10 is a thickness equal to or more than the average particle size of the positive electrode active material, and more specifically, the thickness is preferably 5 µm or more, more preferably 10 µm or more, even more preferably 15 µm or more, and particularly preferably 20 µm or more. The thickness of the positive electrode mixture layer 10 is preferably 100 µm or less, more preferably 80 µm or less, even more preferably 70 µm or less, and particularly preferably 50 µm or less. By adjusting the thickness of the positive electrode mixture layer 10 to 100 µm or less, the charge-discharge bias caused by variation in the charging level of the positive electrode active material in the vicinity of the surface of the positive electrode mixture layer 10 and the vicinity of the surface of the positive electrode current collector 9 can be suppressed.

The negative electrode current collector 11 may be formed from a metal such as aluminum, copper, nickel, or stainless steel; an alloy thereof; or the like. The negative electrode current collector 11 is preferably formed from aluminum or an alloy thereof, in order to be lightweight and have a high weight energy density. From the viewpoints of the ease of processing into a thin film and the cost, the negative electrode current collector 11 is preferably copper. The thickness of the negative electrode current collector 11 may be 10 µm or more and may be 100 µm or less.

According to an embodiment, the negative electrode mixture layer 12 contains a negative electrode active material and a binder.

Regarding the negative electrode active material, those commonly used in the field of energy devices can be used. Specifically, examples of the negative electrode active material include lithium metal, lithium titanate ($Li_4Ti_5O_2$), lithium alloys, other metal compounds, carbon materials, metal complexes, and organic polymer compounds. As the negative electrode active material, these may be used singly or in combination of two or more kinds thereof. Examples of the carbon materials include graphites such as natural graphite (flaky graphite and the like) and artificial graphite; amorphous carbon; carbon fibers; and carbon blacks such as acetylene black, Ketjen black, channel black, furnace black, lamp black, and thermal black. From the viewpoint of obtaining a larger theoretical capacity (for example, 500 to 1500 Ah/kg), the negative electrode active material may be silicon, tin, or a compound including these elements (oxide, nitride, or an alloy with another metal).

From the viewpoint of obtaining a well-balanced negative electrode in which the retention ability of the electrolyte salt is increased while suppressing an increase in the irreversible capacity associated with a decrease in the particle size, the average particle size ($D_{50}$) of the negative electrode active material is preferably 1 µm or more, more preferably 5 µm or more, and even more preferably 10 µm or more, and is preferably 50 µm or less, more preferably 40 µm or less, and even more preferably 30 µm or less. The average particle size ($D_{50}$) of the negative electrode active material is measured by a method similar to that for the above-described average particle size ($D_{50}$) of the positive electrode active material.

The content of the negative electrode active material may be 50% by mass or more, 55% by mass or more, or 60% by mass or more, and may be 99% by mass or less, 95% by mass or less, or 90% by mass or less, based on the total amount of the negative electrode mixture layer.

The type of the binder and the content thereof may be similar to the type of the binder used for the above-mentioned positive electrode mixture layer 10 and the content thereof.

The negative electrode mixture layer 12 may further contain a conductive material and may further contain a solvent that will be described below. The types and contents of the conductive material and the solvent may be similar to the types and contents of the conductive material and the solvent in the above-mentioned positive electrode mixture layer 10, respectively.

From the viewpoint of enhancing the conductivity of the secondary battery 1, the thickness of the negative electrode mixture layer 12 is equal to or more than the average particle size of the negative electrode active material, and more specifically, the thickness is preferably 10 µm or more, more preferably 15 µm or more, and even more preferably 20 µm or more. The thickness of the negative electrode mixture layer 12 is preferably 100 µm or less, 80 µm or less, 70 µm or less, 50 µm or less, 40 µm or less, or 30 µm or less. By adjusting the thickness of the negative electrode mixture layer 12 to 100 µm or less, the charge-discharge bias caused by variation in the charging level of the negative electrode active material in the vicinity of the surface of the negative electrode mixture layer 12 and the vicinity of the surface of the negative electrode current collector 11 can be suppressed.

The electrolyte sheet 7 is a sheet produced by a predetermined manufacturing method and has a role as an electrolyte layer for the secondary battery 1. According to an embodiment, the electrolyte sheet 7 includes a step of molding a composition containing a polymer, Li[TFSI], oxide particles, and a dispersion medium into a sheet shape, and volatilizing the dispersion medium at 100° C. or higher. Hereinafter, the composition containing a polymer, Li[TFSI], oxide particles, and a dispersion medium is also referred to as "electrolyte composition".

Figure 3:
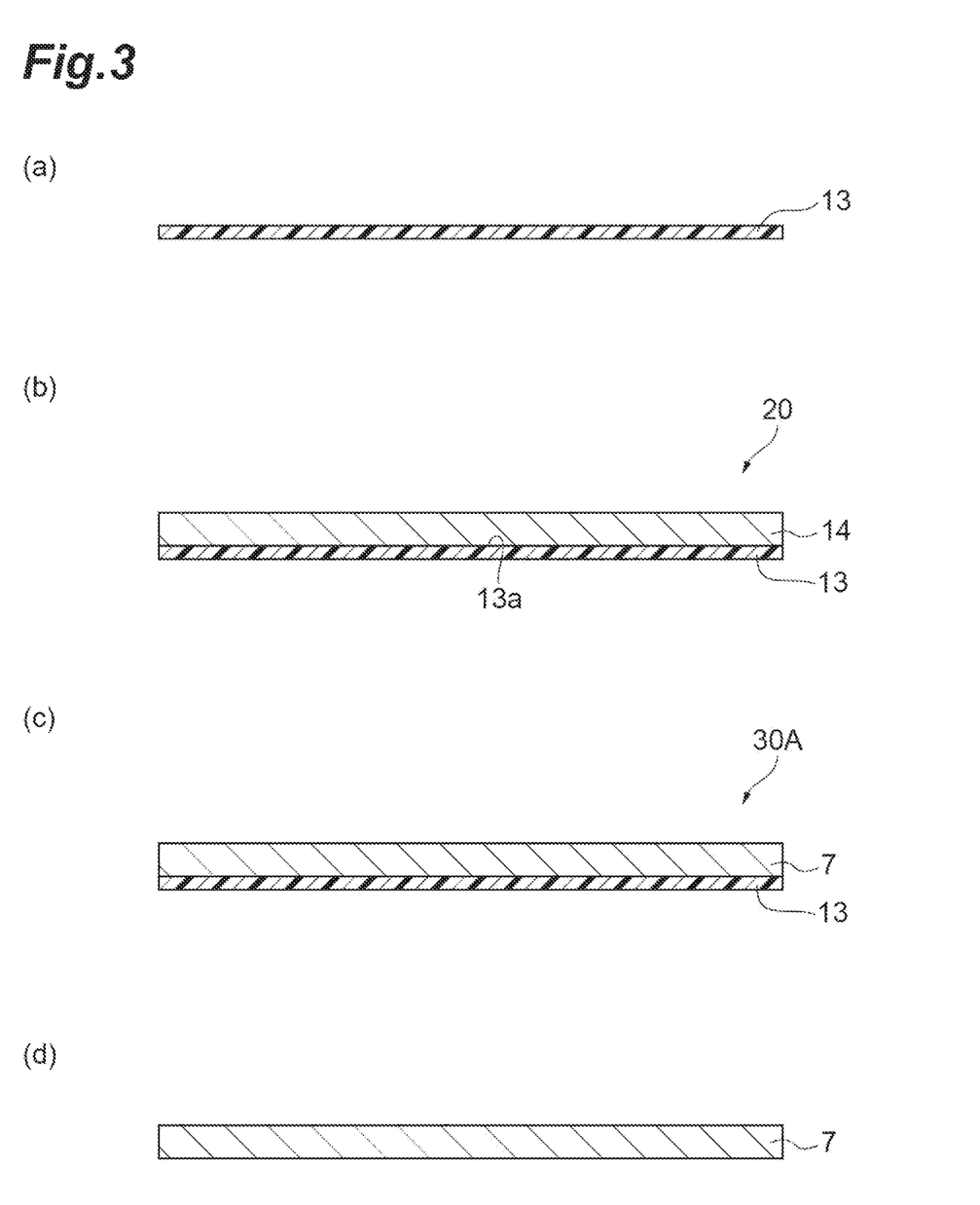
FIG. 3 is a schematic cross-sectional view illustrating an embodiment of a manufacturing method for an electrolyte sheet.

FIG. 3 is a schematic cross-sectional view illustrating an embodiment of a manufacturing method for an electrolyte sheet 7. In this manufacturing method, first, a base material 13 for molding the electrolyte composition into a sheet shape is prepared (FIG. 3(a)).

The base material 13 is not limited as long as it has heat resistance that can withstand heating at the time of volatilizing the dispersion medium, does not react with the electrolyte composition, and is not swollen by the electrolyte composition, and for example, the base material 13 is formed from a resin. Specifically, the base material 13 may be a film formed from a resin (general-purpose engineering plastic) such as polyethylene terephthalate, polyethylene tetrafluoride, polyimide, polyethersulfone, or polyether ketone.

It is preferable that the thickness of the base material 13 is as thin as possible while maintaining the strength that can withstand the tensile force in the coating apparatus. From the viewpoint of reducing the volume of a laminated sheet including an electrolyte sheet 7 and a base material 13 (details will be described below) while securing the strength of the laminated sheet, the thickness of the base material 13 is preferably 5 µm or more, more preferably 10 µm or more, and even more preferably 25 µm or more, and is preferably 100 µm or less, more preferably 50 µm or less, and even more preferably 40 µm or less.

Next, the electrolyte composition 14 is molded into a sheet shape by applying the electrolyte composition 14 on the base material 13 (FIG. 3(b)).

The electrolyte composition 14 contains a polymer, Li[TFSI], oxide particles, and a dispersion medium.

The polymer preferably has a first monomer unit selected from the group consisting of ethylene tetrafluoride and vinylidene fluoride.

The polymer is preferably one kind or two or more kinds of polymers, and among the monomer units constituting one kind or two or more kinds of polymers, preferably, a first monomer unit selected from the group consisting of ethylene tetrafluoride and vinylidene fluoride, and a second monomer unit selected from the group consisting of hexafluoropropylene, acrylic acid, maleic acid, ethyl methacrylate, and methyl methacrylate, are included.

The first monomer unit and the second monomer unit may be included in one kind of polymer and constitute a copolymer. That is, according to an embodiment, the electrolyte composition 14 contains at least one copolymer including both the first monomer unit and the second monomer unit. The copolymer may be a copolymer of vinylidene fluoride and hexafluoropropylene, a copolymer of vinylidene fluoride and maleic acid, a copolymer of vinylidene fluoride and methyl methacrylate, or the like. When the electrolyte composition 14 contains a copolymer, the electrolyte composition 14 may further contain another polymer.

The first monomer unit and the second monomer unit may be respectively included in different polymers and may constitute at least two kinds of polymers consisting of a first polymer having a first monomer unit and a second polymer having a second monomer unit. That is, according to an embodiment, the electrolyte composition 14 contains at least two or more kinds of polymers consisting of a first polymer including a first monomer unit and a second polymer including a second monomer unit. When the electrolyte composition 14 contains a first polymer and a second polymer, the electrolyte composition 14 may further contain another polymer.

The first polymer may be a polymer composed only of the first monomer unit or may be a polymer further having another monomer unit in addition to the first monomer unit. The other monomer unit may include an oxygen-containing hydrocarbon structure such as ethylene oxide ($-CH_2CH_2O-$). The first polymer may be polyethylene tetrafluoride, polyvinylidene fluoride, or a polymer in which the above-described oxygen-containing hydrocarbon structure is introduced into the interior of the molecular structure of the foregoing polymers.

The second polymer may be a polymer composed only of the second monomer unit or may be a polymer further having another monomer unit in addition to the second monomer unit. The other monomer unit may be an oxygen-containing hydrocarbon structure such as ethylene oxide ($-CH_2CH_2O-$).

The combination of the first polymer and the second polymer may be polyvinylidene fluoride and polyacrylic acid, polyethylene tetrafluoride and polymethyl methacrylate, polyvinylidene fluoride and polymethyl methacrylate, or the like.

From the viewpoint of further enhancing the tensile strength of the electrolyte sheet 7, the content of the first monomer unit is preferably 50% by mass or more, 70% by mass or more, 80% by mass or more, 90% by mass or more, or 95% by mass or more, based on the sum of the contents of the first monomer unit and the second monomer unit. From the viewpoint of enhancing the affinity with the solvent in a case where a solvent that will be described below is included in the electrolyte sheet 7, the content of the first monomer unit is preferably 99% by mass or less, 98% by mass or less, 97% by mass or less, or 96% by mass or less, based on the sum of the contents of the first monomer unit and the second structural unit.

From the viewpoint of further enhancing the affinity with the solvent in a case where a solvent that will be described below is included in the electrolyte sheet 7, the content of the second monomer unit is preferably 1% by mass or more, 3% by mass or more, or 4% by mass or more, based on the sum of the contents of the first monomer unit and the second monomer unit. From the viewpoint of further enhancing the tensile strength of the electrolyte sheet 7, the content of the second monomer unit is preferably 50% by mass or less, 40% by mass or less, 30% by mass or less, 20% by mass or less, 10% by mass or less, or 5% by mass or less, based on the sum of the contents of the first monomer unit and the second monomer unit.

The content of the polymer may be 10% by mass or more, 15% by mass or more, or 20% by mass or more, and may be 60% by mass or less, 55% by mass or less, or 50% by mass or less, based on the total amount of non-volatile components of the electrolyte composition 14. Incidentally, the non-volatile components of the electrolyte composition 14 are components excluding the dispersion medium from the electrolyte composition 14. As a result, the content of the polymer in the obtained electrolyte sheet 7 becomes a content similar to the above-mentioned content (the same applies to the following components).

Li[TFSI] is an electrolyte salt, which is lithium bis(trifluoromethanesulfonyl)imide ($LiN(SO_2CF_3)_2$). The content of Li[TFSI] may be 1% by mass or more and may be 50% by mass or less, based on the total amount of non-volatile components of the electrolyte composition 14. By using Li[TFSI] as an electrolyte salt, The electrolyte sheet 7 may further contain another electrolyte salt in addition to Li[TFSI]. The other electrolyte salt may be at least one selected from the group consisting of a lithium salt (except Li[TFSI]), a sodium salt, a calcium salt, and a magnesium salt.

The anion of the other electrolyte salt may be a halide ion ($I^-$, $Cl^-$, $Br^-$, or the like), $SCN^-$, $BF_4^-$, $BF_3(CF_3)^-$, $BF_3(C_2F_5)^-$, $PF_6^-$, $ClO_4^-$, $SbF_6^-$, $[FSI]^-$, $[TFSI]^-$, $N(SO_2C_2F_5)_2^-$, $B(C_6H_5)_4^-$, $B(O_2C_2H_4)_2^-$, $[f3C]^-$, $C(SO_2CF_3)_3^-$, $CF_3COO^-$, $CF_3SO_2O^-$, $C_6F_5SO_2O^-$, $[BOB]^-$, or the like. The anion is preferably $PF_6^-$, $BF_4^-$, $[FSI]^-$, $[TFSI]^-$, $[BOB]^-$, or $ClO_4^-$.

The lithium salt may be at least one selected from the group consisting of $LiPF_6$, $LiBF_4$, $Li[f3C]$, $Li[BOB]$, $LiClO_4$, $LiCF_3BF_3$, $LiC_2F_5BF_3$, $LiC_3F_7BF_3$, $LiC_4F_9BF_3$, $Li[C(SO_2CF_3)_3]$, $LiCF_3SO_3$, $LiCF_3COO$, and $LiRCOO$ (wherein R represents an alkyl group having 1 to 4 carbon atoms, a phenyl group, or a naphthyl group).

The sodium salt may be at least one selected from the group consisting of $NaPF_6$, $NaBF_4$, $Na[FSI]$, $Na[TFSI]$, $Na[f3C]$, $Na[BOB]$, $NaClO_4$, $NaCF_3BF_3$, $NaC_2F_5BF_3$, $NaC_3F_7BF_3$, $NaC_4F_9BF_3$, $Na[C(SO_2CF_3)_3]$, $NaCF_3SO_3$, $NaCF_3COO$, and $NaRCOO$ (wherein R represents an alkyl group having 1 to 4 carbon atoms, a phenyl group, or a naphthyl group).

The calcium salt may be at least one selected from the group consisting of $Ca(PF_6)_2$, $Ca(BF_4)_2$, $Ca[FSI]_2$, $Ca[TFSI]_2$, $Ca[f3C]_2$, $Ca[BOB]_2$, $Ca(ClO_4)_2$, $Ca(CF_3BF_3)_2$, $Ca(C_2F_5BF_3)_2$, $Ca(C_3F_7BF_3)_2$, $Ca(C_4F_9BF_3)_2$, $Ca[C(SO_2CF_3)_3]_2$, $Ca(CF_3SO_3)_2$, $Ca(CF_3COO)_2$, and $Ca(RCOO)_2$ (wherein R represents an alkyl group having 1 to 4 carbon atoms, a phenyl group, or a naphthyl group).

The magnesium salt may be at least one selected from the group consisting of $Mg(PF_6)_2$, $Mg(BF_4)_2$, $Mg[FSI]_2$, $Mg[TFSI]_2$, $Mg[f3C]_2$, $Mg[BOB]_2$, $Mg(ClO_4)_2$, $Mg(CF_3BF_3)_2$, $Mg(C_2F_5BF_3)_2$, $Mg(C_3F_7BF_3)_2$, $Mg(C_4F_9BF_3)_2$, $Mg[C(SO_2CF_3)_3]_2$, $Mg(CF_3SO_3)_2$, $Mg(CF_3COO)_2$, and $Mg(RCOO)_2$ (wherein R represents an alkyl group having 1 to 4 carbon atoms, a phenyl group, or a naphthyl group).

From the viewpoint of suitably producing the electrolyte sheet 7, the content of the other electrolyte salt may be 10% by mass or more and may be 60% by mass or less, based on the total amount of non-volatile components of the electrolyte composition 14.

The electrolyte composition 14 further contains oxide particles. As the electrolyte composition 14 contains oxide particles, the tensile strength of the obtained electrolyte sheet 7 can be further increased, and the ionic conductance of the electrolyte sheet 7 can also be enhanced.

The oxide particles are, for example, particles of an inorganic oxide. The inorganic oxide may be, for example, an inorganic oxide including Li, Mg, Al, Si, Ca, Ti, Zr, La, Na, K, Ba, Sr, V, Nb, B, Ge, and the like as constituent elements. The oxide particles are preferably particles of at least one selected from the group consisting of $SiO_2$, $Al_2O_3$, AlOOH, MgO, CaO, $ZrO_2$, $TiO_2$, $Li_7La_3Zr_2O_{12}$, and $BaTiO_3$. Since the oxide particles have polarity, the oxide particles may promote dissociation of the electrolyte in the electrolyte sheet 7 and enhance the battery characteristics.

The oxide particles may also be particles of an oxide of a rare earth metal. The oxide particles may be specifically scandium oxide, yttrium oxide, lanthanum oxide, cerium oxide, praseodymium oxide, neodymium oxide, samarium oxide, europium oxide, gadolinium oxide, terbium oxide, dysprosium oxide, holmium oxide, erbium oxide, thulium oxide, ytterbium oxide, lutetium oxide, or the like.

The oxide particles may have a hydrophobic surface. The oxide particles usually have hydroxyl groups on the surface thereof and tend to exhibit hydrophilicity. Oxide particles having a hydrophobic surface have a reduced number of hydroxyl groups on the surface as compared with oxide particles that do not have a hydrophobic surface. Therefore, when oxide particles having a hydrophobic surface are used, in a case where an ionic liquid that will be described below is included in the electrolyte sheet 7 (for example, an ionic liquid having $N(SO_2F)_2^-$, $N(SO_2CF_3)_2^-$, or the like as an anionic component), since the ionic liquid is hydrophobic, the affinity between the oxide particles and the ionic liquid is expected to be enhanced. Therefore, the liquid retention properties for the ionic liquid in the electrolyte sheet 7 are further enhanced, and as a result, the ionic conductance of the electrolyte sheet 7 is further enhanced. Furthermore, for a secondary battery having an electrolyte sheet that includes oxide particles having a hydrophobic surface, particularly discharging characteristics can be enhanced.

Oxide particles having a hydrophobic surface can be obtained by, for example, treating oxide particles exhibiting hydrophilicity with a surface treatment agent capable of imparting a hydrophobic surface. That is, the term oxide particles having a hydrophobic surface means oxide particles that have been surface-treated with a surface treatment agent. The surface treatment agent is preferably a silicon-containing compound.

The oxide particles may be surface-treated with a silicon-containing compound. That is, the oxide particles may be oxide particles in which the surface of the oxide particles and silicon atoms of the silicon-containing compound are bonded by means of oxygen atoms. The silicon-containing compound is preferably at least one selected from the group consisting of a halogen-containing alkylsilane, an alkoxysilane, an epoxy group-containing silane, an amino group-containing silane, a silazane, and a siloxane.

The halogen atom in the halogen-containing alkylsilane may be chlorine, fluorine, or the like. A chlorine-containing alkylsilane (alkylchlorosilane) may be methyltrichlorosilane, dimethyldichlorosilane, trimethylchlorosilane, n-octyldimethylchlorosilane, or the like. A fluorine-containing alkylsilane (fluoroalkylsilane) may be trifluoropropyltrimethoxysilane, tridecafluorooctyltrimethoxysilane, or the like.

The alkoxysilane may be methyltrimethoxysilane, dimethyldimethoxysilane, phenyltrimethoxysilane, phenyltriethoxysilane, dimethoxydiphenylsilane, n-propyltrimethoxysilane, hexyltrimethoxysilane, tetraethoxysilane, methyltriethoxysilane, dimethyldiethoxysilane, n-propyltriethoxysilane, or the like.

The epoxy group-containing silane may be 2-(3,4-epoxycyclohexyl)ethyltrimethoxysilane, 3-glycidoxypropylmethyldimethoxysilane, 3-glycidoxypropyltrimethoxysilane, 3-glycidoxypropylmethyldiethoxysilane, 3-glycidoxypropyltriethoxysilane, or the like.

The amino group-containing silane may be N-2-(aminoethyl)-3-aminopropylmethyldimethoxysilane, N-2-(aminoethyl)-3-aminopropyltrimethoxysilane, 3-aminopropyltriethoxysilane, N-phenyl-3-aminopropyltrimethoxysilane, or the like.

The silazane may be hexamethyldisilazane or the like. The siloxane may be dimethylsilicone oil or the like. These compounds may have a reactive functional group (for example, a carboxyl group) at one end or at both ends.

With regard to the oxide particles having a hydrophobic surface (surface-treated oxide particles), those produced by a known method may be used, or a commercially available product may be used as it is.

The oxide particles may generally include primary particles that integrally form single particles (particles that do not constitute secondary particles) and secondary particles formed by aggregation of a plurality of primary particles, as determined from an apparent geometric shape.

From the viewpoint that the discharging characteristics of the secondary battery are excellent, the specific surface area of the oxide particles may be 2 m$^2$/g or more, 5 m$^2$/g or more, 10 m$^2$/g or more, 15 m$^2$/g or more, or 50 m$^2$/g or more, and may be 500 m$^2$/g or less, 400 m$^2$/g or less, 350 m$^2$/g or less, 300 m$^2$/g or less, 200 m$^2$/g or less, 100 m$^2$/g or less, 90 m$^2$/g or less, 80 m$^2$/g or less, or 60 m$^2$/g or less. The specific surface area of the oxide particles means the specific surface area of the entirety of the oxide particles including primary particles and secondary particles and is measured by a BET method.

From the viewpoint of enhancing the conductivity of the secondary battery 1, the average primary particle size (average particle size of the primary particles) of the oxide particles is preferably 0.005 μm (5 nm) or more, more preferably 0.01 μm (10 nm) or more, and even more preferably 0.015 μm (15 nm) or more. From the viewpoint of making the electrolyte sheet 7 thinner, the average primary particle size of the oxide particles is preferably 1 μm or less, more preferably 0.1 μm or less, and even more preferably 0.05 μm or less. The average primary particle size of the oxide particles can be measured by observing the oxide particles by means of a transmission electron microscope or the like.

From the viewpoint of easily obtaining an electrolyte sheet 7 having excellent tensile strength and ionic conductance, the content of the oxide particles is preferably 5% by mass or more, 10% by mass or more, or 15% by mass or more, and is preferably 80% by mass or less, 70% by mass or less, or 60% by mass or less, based on the total amount of non-volatile components of the electrolyte composition 14.

The dispersion medium may be water, an organic solvent, or the like. The organic solvent may be N-methyl-2-pyrrolidone (NMP), cyclohexanone, methyl ethyl ketone, 2-butanol, dimethylacetamide, or the like. The dispersion medium is preferably NMP. The amount of addition of the dispersion medium can be appropriately adjusted so that the electrolyte composition 14 can be applied on the base material 13.

The electrolyte composition 14 may further contain a solvent. The solvent is preferably at least one selected from the group consisting of an ionic liquid and a glyme represented by the following Formula (1):

$$R^1O-(CH_2CH_2O)_k-R^2 \quad (1)$$

wherein in Formula (1), $R^1$ and $R^2$ each independently represent an alkyl group having 1 to 4 carbon atoms; and k represents an integer of 3 to 6.

The ionic liquid contains the following anionic component and cationic component. Incidentally, the ionic liquid of the present specification is a substance that is liquid at −20° C. or higher.

The anionic component of the ionic liquid is not particularly limited; however, the anionic component may be a halogen anion such as Cl$^-$, Br$^-$, or I$^-$; an inorganic anion such as BF$_4^-$ or N(SO$_2$F)$_2^-$ ([FSI]$^-$); or an organic anion such as B(C$_6$H$_5$)$_4^-$, CH$_3$SO$_2$O$^-$, CF$_3$SO$_2$O$^-$, N(SO$_2$C$_4$F$_9$)$_2^-$, N(SO$_2$CF$_3$)$_2^-$ ([TFSI]$^-$), or N(SO$_2$C$_2$F$_5$)$_2^-$. The anionic component of the ionic liquid preferably contains at least one kind of an anionic component represented by the following Formula (2):

$$N(SO_2C_mF_{2m+1})SO_2C_nF_{2n+1})^- \quad (2)$$

wherein m and n each independently represent an integer of 0 to 5; and m and n may be identical with or different from each other and are preferably identical with each other.

Examples of the anionic component represented by Formula (2) include N(SO$_2$C$_4$F$_9$)$_2^-$, N(SO$_2$F)$_2^-$ ([TFSI]$^-$), N(SO$_2$CF$_3$)$_2^-$ ([TFSI]$^-$), and N(SO$_2$C$_2$F$_5$)$_2$. From the viewpoint of further enhancing the ionic conductance of the secondary battery 1, the anionic component of the ionic liquid more preferably contains at least one selected from the group consisting of N(SO$_2$C$_4$F$_9$)$_2^-$, CF$_3$SO$_2$O$^-$, [FSI]$^-$, [TFSI]$^-$, and N(SO$_2$C$_2$F$_5$)$_2^-$ and even more preferably contains [FSI]$^-$.

The cationic component of the ionic liquid is not particularly limited; however, the cationic component is preferably at least one selected from the group consisting of a chain-like quaternary onium cation, piperidinium cation, pyrrolidinium cation, pyridinium cation, and imidazolium cation.

The chain-like quaternary onium cation is, for example, a compound represented by the following Formula (3):

[Chemical Formula 1]

wherein in Formula (3), $R^3$ to $R^6$ each independently represent a chain-like alkyl group having 1 to 20 carbon atoms, or a chain-like alkoxyalkyl group represented by R—O—(CH$_2$)$_n$— (wherein R represents a methyl group or an ethyl group; and n represents an integer of 1 to 4); X represents a nitrogen atom or a phosphorus atom; and the number of carbon atoms of the alkyl group represented by $R^3$ to $R^6$ is preferably 1 to 20, more preferably 1 to 10, and even more preferably 1 to 5.

The piperidinium cation is, for example, a six-membered ring cyclic compound containing nitrogen, which is represented by the following Formula (4):

[Chemical Formula 2]

wherein in Formula (4), $R^7$ and $R^8$ each independently represent an alkyl group having 1 to 20 carbon atoms, or an alkoxyalkyl group represented by R—O—(CH$_2$)$_n$— (wherein R represents a methyl group or an ethyl group; and n represents an integer of 1 to 4); and the number of carbon atoms of the alkyl group represented by $R^7$ and $R^7$ is preferably 1 to 20, more preferably 1 to 10, and even more preferably 1 to 5.

The pyrrolidinium cation is, for example, a 5$^-$ membered ring cyclic compound represented by the following Formula (5):

[Chemical Formula 3]

(5)

wherein in Formula (5), $R^9$ and $R^{10}$ each independently represent an alkyl group having 1 to 20 carbon atoms, or an alkoxyalkyl group represented by R—O—$(CH_2)_n$— (wherein R represents a methyl group or an ethyl group; and n represents an integer of 1 to 4); and the number of carbon atoms of the alkyl group represented by $R^9$ and $R^{10}$ is preferably 1 to 20, more preferably 1 to 10, and even more preferably 1 to 5.

The pyridinium cation is, for example, a compound represented by the following Formula (6):

[Chemical Formula 4]

(6)

wherein in Formula (6), $R^{11}$ to $R^{15}$ each independently represent an alkyl group having 1 to 20 carbon atoms, an alkoxyalkyl group represented by R—O—$(CH_2)_n$— (wherein R represents a methyl group or an ethyl group; and n represents an integer of 1 to 4), or a hydrogen atom; and the number of carbon atoms of the alkyl group represented by $R^{11}$ to $R^{15}$ is preferably 1 to 20, more preferably 1 to 10, and even more preferably 1 to 5.

The imidazolium cation is, for example, a compound represented by the following Formula (7):

[Chemical Formula 5]

(7)

wherein in Formula (7), $R^{16}$ to $R^{20}$ each independently represent an alkyl group having 1 to 20 carbon atoms, an alkoxyalkyl group represented by R—O—$(CH_2)_n$— (wherein R represents a methyl group or an ethyl group; and n represents an integer of 1 to 4), or a hydrogen atom; and the number of carbon atoms of the alkyl group represented by $R^{16}$ to $R^{20}$ is preferably 1 to 20, more preferably 1 to 10, and even more preferably 1 to 5.

The ionic liquid is more specifically N,N-diethyl-N-methyl-N-(2-methoxyethyl)ammonium-bis(trifluoromethanesulfonyl)imide (DEME-TFSI), N,N-diethyl-N-methyl-N-(2-methoxyethyl)ammonium-bis(fluorosulfonyl)imide (DEME-FSI), 1-ethyl-3-methylimidazolium-bis(trifluoromethanesulfonyl)imide (EMI-TFSI), 1-ethyl-3-methylimidazolium-bis(fluorosulfonyl)imide (EMI-FSI), N-methyl-N-propylpyrrolidinium-bis(trifluoromethanesulfonyl)imide (Py13-TFSI), N-methyl-N-propylpyrrolidinium-bis(fluorosulfonyl)imide (Py13-FSI), N-ethyl-N-methylpyrrolidinium-bis(trifluoromethanesulfonyl)imide (Py12-TFSI), N-ethyl-N-methylpyrrolidinium-bis(fluorosulfonyl)imide (Py12-FSI), 1-ethyl-3-methylimidazolium dicyanamide (EMI-DCA), or the like.

With regard to the above-mentioned glyme represented by Formula (1), $R^1$ and $R^2$ in Formula (1) each independently represent an alkyl group having 4 or fewer carbon atoms or a fluoroalkyl group having 4 or fewer carbon atoms; and k represents an integer of 1 to 6. R and $R^2$ are each independently preferably a methyl group or an ethyl group.

The glyme may be specifically monoglyme (k=1), diglyme (k=2), triglyme (k=3), tetraglyme (k=4), pentaglyme (k=5), or hexaglyme (k=6).

In a case where the electrolyte composition 14 contains a glyme as a solvent, a portion or the entirety of the glyme may form a complex with Li[TFSI].

From the viewpoint of suitably producing the electrolyte sheet 7, the content of the solvent may be 10% by mass or more and may be 80% by mass or less or 60% by mass or less, based on the total amount of non-volatile components of the electrolyte composition 14.

In a case where the electrolyte composition 14 contains a solvent, from the viewpoint of further enhancing the conductivity of the secondary battery 1 and suppressing a decrease in capacity, the total content of Li[TFSI] and the solvent is preferably 10% by mass or more, more preferably 25% by mass or more, and even more preferably 40% by mass or more, based on the total amount of non-volatile components of the electrolyte composition, and from the viewpoint of suppressing a decrease in strength of the electrolyte sheet 7, the total content is preferably 80% by mass or less, and more preferably 70% by mass or less.

In a case where the electrolyte composition 14 contains a solvent, from the viewpoint of enhancing the charging and discharging characteristics of the secondary battery 1, the concentration of Li[TFSI] per unit volume of the solvent is preferably 0.5 mol/L or more, more preferably 0.7 mol/L or more, and even more preferably 1.0 mol/L or more, and is preferably 2.0 mol/L or less, more preferably 1.8 mol/L or less, and even more preferably 1.6 mol/L or less.

The electrolyte composition 14 may contain other components. Examples of the other components include fibers such as cellulose fibers, resin fibers, and glass fibers. The content of the other components may be 0.1% to 20% by mass based on the total amount of non-volatile components of the electrolyte composition 14.

In this step, according to an embodiment, the electrolyte composition 14 is applied on one surface 13a of a base material as shown in FIG. 3(b). As a result, a laminated body 20 including the base material 13 and the electrolyte composition 14 applied on the base material 13 is produced. Examples of a method of applying the electrolyte composition 14 on the base material 13 include a method of applying the composition by using an applicator and a method of applying the composition by means of a spray.

From the viewpoint of further increasing the tensile strength and also further enhancing safety, the thickness at the time of applying the electrolyte composition 14 is preferably 5 μm or more, more preferably 10 μm or more, and even more preferably 15 μm or more. From the viewpoint of reducing the internal resistance of the secondary battery 1 and from the viewpoint of further enhancing large current characteristics, the thickness at the time of applying the electrolyte composition 14 is preferably 200 μm or less, more preferably 150 μm or less, and even more preferably 100 μm or less. The thickness at the time of applying the electrolyte composition 14 corresponds to the thickness of the electrolyte sheet 7.

Subsequently, the dispersion medium included in the electrolyte composition 14 applied on the base material 13 is volatilized to obtain the electrolyte sheet 7 (FIG. 3(c)). As a result, a laminated sheet 30A including the base material 13 and the electrolyte sheet 7 formed on the base material 13 can be obtained.

With regard to volatilization of the dispersion medium, for example, a laminated body including the base material 13 and the electrolyte composition applied on the base material 13 may be placed in a drying furnace or the like and then the dispersion medium in the electrolyte composition 14 may be volatilized.

The temperature at the time of volatilizing the dispersion medium (volatilization temperature) is 100° C. or higher. As a result, an electrolyte sheet 7 having excellent tensile strength can be formed. The volatilization temperature may be higher than 100° C. and is preferably 105° C. or higher, 110° C. or higher, 115° C. or higher, or 120° C. or higher. As the volatilization temperature is higher than 100° C., when the electrolyte sheet is used for a secondary battery, the cycling characteristics of the secondary battery can be enhanced. Furthermore, as the volatilization temperature is higher than 100° C., productivity or production efficiency can be increased, and the production cost can be reduced. The volatilization temperature may be 150° C. or lower, 145° C. or lower, or 140° C. or lower, from the viewpoint of enhancing the ionic conductance of the electrolyte sheet 7, from the viewpoint of increasing the light transmittance, and from the viewpoint of lowering the haze. The temperature at the time of volatilizing the dispersion medium of the present specification is the ambient temperature during volatilization of the dispersion medium, and for example, in the case of using a drying furnace, the temperature refers to the temperature inside the drying furnace.

The time for volatilizing the dispersion medium (volatilization time) can be appropriately adjusted according to the volatilization temperature and the production scale.

In the step of molding the electrolyte composition 14 into a sheet shape and volatilizing the dispersion medium at 100° C. or higher, as described above, the electrolyte composition 14 may be applied on the base material 13 to obtain the laminated body 20, and then the dispersion medium may be volatilized by placing the laminated body 20 in a drying furnace; however, as another example, a laminated sheet 30A may be continuously obtained by applying the electrolyte composition 14 on the base material 13 in an environment at 100° C. or higher while volatilizing the dispersion medium in parallel. In this case, the volatilization time for the dispersion medium begins from the time point when the electrolyte composition 14 is applied on the base material 13.

When the secondary battery 1 is produced, the electrolyte sheet 7 can be obtained by peeling off the base material 13 from the laminated sheet 30A (FIG. 3(d)).

The laminated sheet can be continuously produced while winding the laminated sheet into a roll shape. In that case, as the surface of the electrolyte sheet 7 comes into contact with the back surface of the base material 13, and a portion of the electrolyte sheet 7 sticks to the base material 13, the electrolyte sheet 7 may be damaged. In order to prevent such a situation, the electrolyte sheet 7 may be produced by producing a laminated sheet having a three-layered structure, in which a protective material is provided on the electrolyte sheet 7 on the opposite side of the base material 13, as another embodiment.

Figure 4:
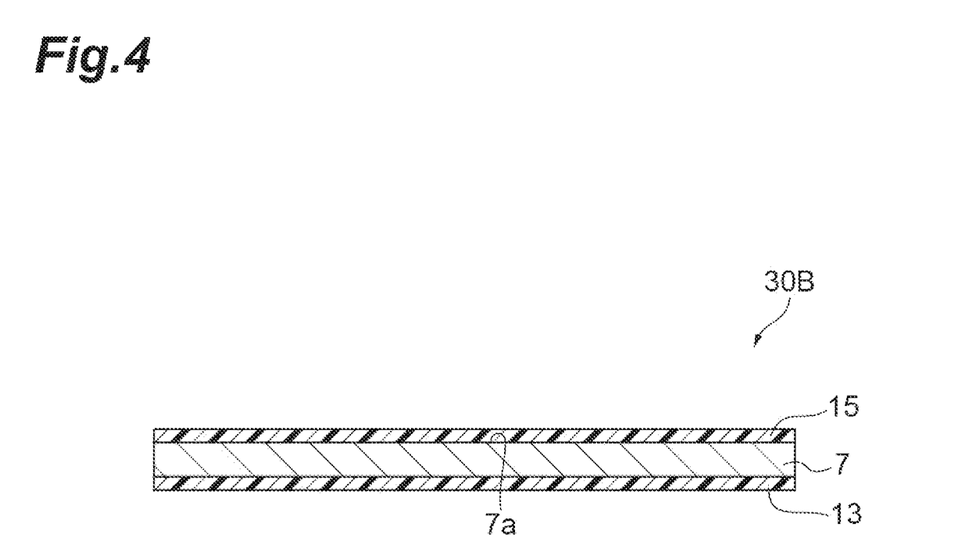
FIG. 4 is a schematic cross-sectional view illustrating an embodiment of a laminated sheet.

FIG. 4 is a schematic cross-sectional view illustrating a laminated sheet of another embodiment. As shown in FIG. 4, this laminated sheet 30B further includes, as shown in FIG. 3(b), a protective material 15 on surface 7a of the electrolyte sheet 7, the surface 7a being on the opposite side of the base material 13.

The laminated sheet 30B can be obtained, after obtaining a laminated body (laminated sheet 30A) including the base material 13 and the electrolyte sheet 7 by the above-described method, by laminating the protective material 15 so as to cover one surface of the electrolyte sheet 7 on the opposite side of the base material 13.

The protective material 15 may be a material that can be easily peeled from the electrolyte sheet 7 and is preferably a non-polar resin film of polyethylene, polypropylene, polyethylene tetrafluoride, or the like. When a non-polar resin film is used, the electrolyte sheet 7 and the protective material 15 do not stick to each other, and the protective material 15 can be easily peeled off.

From the viewpoint of securing strength while reducing the volume of the entirety of the laminated sheet 30B, the thickness of the protective material 15 is preferably 5 μm or more and more preferably 10 μm, and is preferably 100 μm or less, more preferably 50 μm or less, and even more preferably 30 μm or less.

When the secondary battery 1 is produced, the electrolyte sheet 7 can be obtained by peeling off the base material 13 and the protective material 15 from the laminated sheet 30B.

The electrolyte sheet 7 obtainable by the manufacturing method described above has excellent tensile strength, and in addition, coloration is suppressed, while the external appearance is excellent. Whether coloration of the electrolyte sheet 7 is suppressed and the external appearance is excellent can be checked by, for example, measuring the transmittance, degree of yellowness, and haze of the electrolyte sheet 7.

The light transmittance of the electrolyte sheet 7 can be measured by using a spectral haze meter (for example, SH7000 manufactured by NIPPON DENSHOKU INDUSTRIES CO., LTD.) according to JIS K7361-1 (Plastics-Detennination of the total luminous transmittance of transparent materials). In this case, the size of a test specimen that is cut out from the electrolyte sheet 7 may be adjusted according to the apparatus to be used. The light transmittance of the present specification means an average value of a obtained by determining an average value a of light transmittance that is measured at every 5 nm in a wavelength region of 380 to 780 nm for one test specimen and calculating the average value for three test specimens.

In a case where the light transmittance of an electrolyte sheet included in a secondary battery, a secondary battery in a state of being initially charged and discharged (within 10 cycles) may be disassembled in an argon atmosphere, the electrolyte sheet may be taken out and dried for 24 hours or longer, and the light transmittance may be measured by the above-described measuring method.

The light transmittance of the electrolyte sheet 7 may be, for example, 90% or higher, 90.5% or higher, 91% or higher, or 91.5% or higher and may be 95% or lower, 94.5% or lower, 94% or lower, or 93.5% or lower.

The haze of the electrolyte sheet 7 can be measured by using a spectral haze meter (for example, SH7000 manufactured by NIPPON DENSHOKU INDUSTRIES CO., LTD.) according to JIS K7361 (Plastics-Determination of haze for transparent materials). At this time, the percentage of transmitted light deviated by 2.5° or more from the incident light by forward scattering in the transmitted light that is transmitted through a test specimen cut out from the electrolyte sheet 7, is referred to as haze. The haze of the present specification means an average value of p obtained by determining an average value R of haze that is measured at every 5 nm in a wavelength region of 380 to 780 nm for one test specimen and calculating the average value for three test specimens. The size of the test specimen may be adjusted according to the apparatus used, as in the case of measurement of the light transmittance.

The haze of the electrolyte sheet 7 may be, for example, 15% or higher, 20% or higher, 25% or higher, or 30% or higher and may be 45% or lower, 40% or lower, 38% or lower, or 36% or lower.

The degree of yellowness of the electrolyte sheet 7 can be measured by using a spectral haze meter (for example, SH7000 manufactured by NIPPON DENSHOKU INDUSTRIES CO., LTD.) according to ASTM E313-05 with a C light source (Illuminant C). The degree of yellowness of the present specification is an average value of the degree of yellowness measured for three test specimens. The size of the test specimen may be adjusted according to the apparatus used, as in the case of measurement of the light transmittance.

The degree of yellowness of the electrolyte sheet 7 may be, for example, 18 or less, 14 or less, 8 or less, 4 or less, or 2 or less and may be 0 or more, 0.1 or more, or 0.2 or more.

Next, a manufacturing method for a secondary battery 1 including the above-mentioned electrolyte sheet 7 will be described. A manufacturing method for a secondary battery 1 of an embodiment includes a first step of forming a positive electrode mixture layer 10 on a positive electrode current collector 9 to obtain a positive electrode 6; a second step of forming a negative electrode mixture layer 12 on a negative electrode current collector 11 to obtain a negative electrode 8; and a third step of disposing the electrolyte sheet 7 between the positive electrode 6 and the negative electrode 8. The order of the first step and the second step is arbitrary.

In the first step, the positive electrode 6 is obtained by, for example, dispersing a material that is used for the positive electrode mixture layer in a dispersion medium by using a kneading machine, a dispersing machine, or the like to obtain a positive electrode mixture in a slurry form, subsequently applying this positive electrode mixture on a positive electrode current collector 9 by a doctor blade method, a dipping method, a spraying method, or the like, and then volatilizing the dispersion medium. After the dispersion medium is volatilized, a compression molding step by means of roll pressing may be provided as necessary. The positive electrode mixture layer 10 may also be formed as a positive electrode mixture layer having a multilayer structure by performing the above-described steps from application of a positive electrode mixture to volatilization of the dispersion medium several times.

The dispersion medium used in the first step may be water, N-methyl-2-pyrrolidone (NMP), or the like.

A method of forming the negative electrode mixture layer 12 on the negative electrode current collector 11 in the second step may be a method similar to the above-described method of the first step.

In the third step, according to an embodiment, the electrolyte sheet 7 obtainable by the above-described manufacturing method is disposed between the positive electrode 6 and the negative electrode 8. At this time, the electrolyte sheet 7 may be disposed so as to be in contact with the positive electrode mixture layer 10 in the positive electrode 6 and the negative electrode mixture layer 12 in the negative electrode 8.

A method of disposing the electrolyte sheet 7 between the positive electrode 6 and the negative electrode 8 is a method of laminating the positive electrode 6, the electrolyte sheet 7, and the negative electrode 8 by, for example, lamination. As a result, a secondary battery 1 including a positive electrode 6, a negative electrode 8, and an electrolyte sheet 7 provided between the positive electrode 6 and the negative electrode 8 can be obtained.

With regard to the secondary battery 1 obtained in this manner, since an electrolyte sheet 7 having excellent tensile strength and excellent ionic conductance is used, the battery performance such as the charging and discharging performance is excellent.

Figure 5:
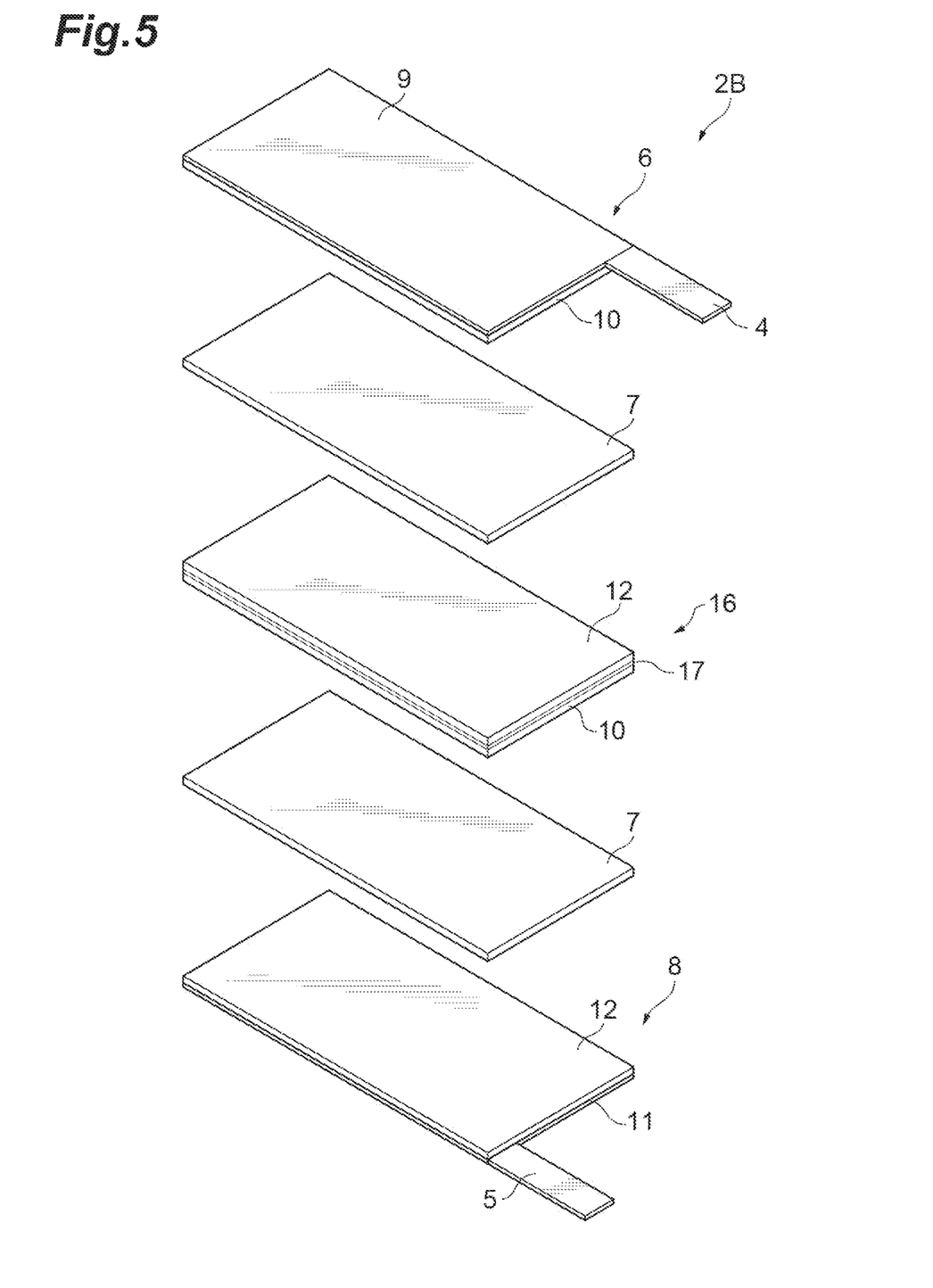
FIG. 5 is an exploded perspective view illustrating an embodiment of an electrode group of a bipolar-type secondary battery.

An electrolyte sheet obtained by the manufacturing method described above can also be used for a so-called bipolar-type secondary battery as another embodiment. FIG. 5 is an exploded perspective view illustrating an embodiment of an electrode group of a bipolar-type secondary battery. The electrode group 2B includes a positive electrode 6, a first electrolyte sheet 7, a bipolar electrode 16, a second electrolyte sheet 7, and a negative electrode 8 in this order. The bipolar electrode 16 includes a bipolar electrode current collector 17, a positive electrode mixture layer 10 provided on a surface on the negative electrode 8 side (positive electrode surface) of the bipolar electrode current collector 17, and a negative electrode mixture layer 12 provided on a surface on the positive electrode 6 side (negative electrode surface) of the bipolar electrode current collector.

The bipolar electrode current collector 17 is formed from, for example, a simple metal substance such as aluminum, stainless steel, or titanium; or a clad material obtained by roll bonding aluminum with copper or stainless steel with copper.

The first electrolyte sheet 7 and the second electrolyte sheet 7 may be the above-mentioned electrolyte sheets. The first electrolyte sheet 7 and the second electrolyte sheet 7 may be of the same type or different types from each other in terms of the composition, and they are preferably of the same type with each other.

Since this bipolar-type secondary battery also uses the above-mentioned electrolyte sheet 7 having excellent tensile strength and excellent ionic conductance, the battery performance such as the charging and discharging performance is excellent.

EXAMPLES

Hereinafter, the present invention will be specifically described by way of Examples; however, the present invention is not intended to be limited to these Examples.

Example 1

Li[TFSI] was dissolved in EMI[FSI] at a concentration of 1.5 mol/L. 43 parts by mass of this solution, 23 parts by mass of $SiO_2$ particles (AEROSIL OX50, manufactured by NIPPON AEROSIL CO., LTD.), and 34 parts by mass of a copolymer of vinylidene fluoride and hexafluoropropylene (PVDF-HFP) were mixed, subsequently NMP as a dispersion medium was added thereto, and an electrolyte composition was prepared. In a drying furnace in which the temperature in the furnace was set to 100° C., the electrolyte composition was applied on a base material made of polyethylene terephthalate by using an applicator. At this time, the thickness of the electrolyte composition after drying was adjusted to be 20 μm. After application, the dispersion medium was volatilized by leaving the electrolyte composition to stand in the drying furnace at the same temperature for 30 minutes, and a laminated sheet in which an electrolyte sheet was formed on the base material was obtained. That is, for the production of the laminated sheet of the present Example, the volatilization temperature for the dispersion medium is 100° C., which is the temperature inside the drying furnace, and the volatilization time for the dispersion medium is 30 minutes.

Examples 2 to 6

Laminated sheets were produced by changing the volatilization temperature for the dispersion medium (temperature inside the drying furnace) employed in Example 1 to the temperatures shown in Table 1, while not changing other conditions.

Comparative Example 1

A laminated sheet was produced by changing the volatilization temperature for the dispersion medium (temperature inside the drying furnace) employed in Example 1 to 80° C., while not changing other conditions.

Comparative Example 2

A laminated sheet was produced by changing Li[TFSI] employed in Example 1 to Li[FSI], while not changing other conditions.

<Evaluation of Physical Properties of Electrolyte Sheet>

For products obtained by peeling off the base material from the laminated sheets of Examples and Comparative Examples (electrolyte sheets), each physical property was evaluated by the following method. The respective results are shown in Table 1.

With regard to tensile strength, the electrolyte sheet was cut out to 5 mm in width and interposed between chucks, and then the electrolyte sheet was fixed to a pedestal with a tape such that the length was 20 mm. Then, the electrolyte sheet was pulled by using a force gauge (FGP-5, manufactured by NIDEC-SHIMPO CORPORATION), and the strength at the time of rupture of the electrolyte sheet was measured.

The light transmittance, the degree of yellowness (Illuminant C), and haze were measured by the above-described methods by using a spectral haze meter (SH7000, manufactured by NIPPON DENSHOKU INDUSTRIES CO., LTD.).

With regard to the ionic conductance, the electrolyte sheet was disposed in a bipolar-type sealed cell (HS cell, manufactured by Hohsen Corp.), and the ionic conductance was measured by using an AC impedance analyzer (1260 type, manufactured by Solartron ISA). The AC impedance was measured at room temperature (25° C.) at 10 mV in the range of 1 Hz to 10 MHz. The ionic conductance was calculated from the resistance value obtained from the width of an arc of a Nyquist plot, by using the following formula. Incidentally, disposition of the electrolyte sheet in the sealed cell was performed in a dry room.

Ionic conductance [S/cm]=(1/resistance [Ω])×(thickness of electrolyte sheet [cm]/area of electrolyte sheet [cm$^2$])

TABLE 1

| | Example | | | | | | Comparative Example | |
|---|---|---|---|---|---|---|---|---|
| | 1 | 2 | 3 | 4 | 5 | 6 | 1 | 2 |
| Type of electrolyte salt | Li[TFSI] | | | | | | Li[FSI] | |
| Volatilization temperature (° C.) | 100 | 105 | 110 | 120 | 130 | 140 | 80 | 130 |
| Tensile strength | 3.3 | 3.3 | 3.4 | 3.4 | 3.3 | 3.0 | 1.9 | 0.5 |
| Light transmittance (%) | 93.3 | 93.2 | 93.1 | 92.9 | 92.3 | 91.0 | 93.5 | 80.2 |
| Degree of yellowness | 1.0 | 1.0 | 1.0 | 1.0 | 1.0 | 1.3 | 1.0 | 21.2 |
| Haze (%) | 33 | 33.2 | 33.5 | 34.0 | 34.5 | 36.0 | 32 | 57.0 |
| Ionic conductance | $6.5 \times 10^{-5}$ | $6.5 \times 10^{-5}$ | $6.4 \times 10^{-5}$ | $6.3 \times 10^{-5}$ | $6.0 \times 10^{-5}$ | $4.0 \times 10^{-5}$ | $6.8 \times 10^{-5}$ | $1.0 \times 10^{-7}$ |

REFERENCE SIGNS LIST

1: secondary battery, 6: positive electrode, 7: electrolyte sheet, 8: negative electrode, 9: positive electrode current collector, 10: positive electrode mixture layer, 11: negative electrode current collector, 12: negative electrode mixture layer.

The invention claimed is:

1. A manufacturing method for an electrolyte sheet, the manufacturing method comprising:
   a step of molding a composition containing a polymer, Li [TFSI], oxide particles, and a dispersion medium into a sheet shape and then volatilizing the dispersion medium at a temperature greater than 105° C. and less than 150° C.

2. The manufacturing method according to claim 1, wherein the composition further contains at least one solvent selected from the group consisting of an ionic liquid and a glyme represented by the following Formula (1):

$$R^1O—(CH_2CH_2O)_k—R^2 \quad (1)$$

wherein in Formula (1), $R^1$ and $R^2$ each independently represent an alkyl group having 1 to 4 carbon atoms; and k represents an integer of 3 to 6.

3. A manufacturing method for a secondary battery, the manufacturing method comprising:
   a step of forming a positive electrode mixture layer on a positive electrode current collector to obtain a positive electrode;
   a step of forming a negative electrode mixture layer on a negative electrode current collector to obtain a negative electrode; and a step of disposing an electrolyte sheet obtainable by the manufacturing method according to claim 1, between the positive electrode and the negative electrode.

4. A manufacturing method for a secondary battery, the manufacturing method comprising:

a step of forming a positive electrode mixture layer on a positive electrode current collector to obtain a positive electrode;

a step of forming a negative electrode mixture layer on a negative electrode current collector to obtain a negative electrode; and a step of disposing an electrolyte sheet obtainable by the manufacturing method according to claim 2, between the positive electrode and the negative electrode.

* * * * *